United States Patent
Poscher et al.

(10) Patent No.: US 9,888,083 B2
(45) Date of Patent: Feb. 6, 2018

(54) TRANSCRIPTION OF COMMUNICATION SESSIONS

(71) Applicant: Telefonaktiebolaget L M Ericsson (publ), Stockholm (SE)

(72) Inventors: Jens Poscher, Aachen (DE); Branko Djordjevic, Herzogenrath (DE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 152 days.

(21) Appl. No.: 14/908,887

(22) PCT Filed: Aug. 2, 2013

(86) PCT No.: PCT/EP2013/066291
§ 371 (c)(1),
(2) Date: Jan. 29, 2016

(87) PCT Pub. No.: WO2015/014409
PCT Pub. Date: Feb. 5, 2015

(65) Prior Publication Data
US 2016/0164979 A1    Jun. 9, 2016

(51) Int. Cl.
*H04L 12/16*    (2006.01)
*H04L 29/08*    (2006.01)
(Continued)

(52) U.S. Cl.
CPC ........ *H04L 67/141* (2013.01); *H04L 12/1403* (2013.01); *H04L 51/046* (2013.01);
(Continued)

(58) Field of Classification Search
CPC . H04L 67/141; H04L 65/605; H04L 65/1016; H04L 65/1096; H04L 12/1403; H04L 51/046; H04L 51/38
See application file for complete search history.

(56) References Cited

U.S. PATENT DOCUMENTS

| | | | |
|---|---|---|---|
| 9,710,819 B2 * | 7/2017 | Cloran | G06Q 30/02 |
| 2003/0101054 A1 * | 5/2003 | Davis | G10L 15/26 |
| | | | 704/235 |

(Continued)

FOREIGN PATENT DOCUMENTS

WO    WO 2008/027609 A1    3/2008

OTHER PUBLICATIONS

International Search Report and Written Opinion of the International Searching Authority, Application No. PCT/EP2013/066291, dated Mar. 27, 2014.

(Continued)

*Primary Examiner* — Kevin Mew
(74) *Attorney, Agent, or Firm* — Sage Patent Group

(57) ABSTRACT

A system, methods, nodes, and computer programs for transcribing of a communication session in a communication network are described. The communication network includes a control server for controlling the communication session, wherein the communication session is established between a user equipment and a remote end. The method includes that the control server receives a service indication indicating that a transcript of the communication session is requested and sends a transcription request for the communication session to a policy controller of the communication network. The policy controller determines at least one policy rule corresponding to the received transcription request and sends the determined at least one policy rule to a packet gateway node of the communication network. The packet gateway node provides, based on the at least one policy rule, a transcription or transcript chunk of at least one speech stream related to the communication session.

35 Claims, 9 Drawing Sheets

(51) Int. Cl.
*H04L 29/06* (2006.01)
*H04L 12/14* (2006.01)
*H04L 12/58* (2006.01)

(52) U.S. Cl.
CPC .......... *H04L 51/38* (2013.01); *H04L 65/1016* (2013.01); *H04L 65/1096* (2013.01); *H04L 65/605* (2013.01)

(56) References Cited

U.S. PATENT DOCUMENTS

| | | | | |
|---|---|---|---|---|
| 2004/0064317 | A1* | 4/2004 | Othmer | G06Q 10/10 704/260 |
| 2008/0198979 | A1* | 8/2008 | Skakkebaek | H04L 51/066 379/88.13 |
| 2009/0276215 | A1* | 11/2009 | Hager | G06F 17/273 704/235 |
| 2010/0027765 | A1 | 2/2010 | Schultz et al. | |
| 2010/0228546 | A1 | 9/2010 | Dingler et al. | |
| 2011/0022387 | A1* | 1/2011 | Hager | G06Q 10/107 704/235 |
| 2011/0173001 | A1* | 7/2011 | Guy, III | G06F 17/2276 704/246 |
| 2013/0094637 | A1* | 4/2013 | Shaw | H04M 3/42059 379/88.18 |
| 2013/0122871 | A1* | 5/2013 | Shaw | H04W 4/06 455/413 |
| 2013/0177143 | A1* | 7/2013 | Zhou | H04M 11/10 379/88.14 |
| 2014/0195229 | A1* | 7/2014 | Charugundla | G10L 15/265 704/235 |
| 2014/0255003 | A1* | 9/2014 | Abramson | G06F 17/30247 386/240 |
| 2015/0304865 | A1 | 10/2015 | Poscher | |
| 2016/0088150 | A1* | 3/2016 | Lam | H04M 3/42221 370/259 |
| 2016/0234666 | A1* | 8/2016 | Basore | H04W 4/22 |
| 2017/0116993 | A1* | 4/2017 | Miglietta | G10L 15/30 |
| 2017/0134583 | A1* | 5/2017 | Shaw | H04M 3/53333 |

OTHER PUBLICATIONS

3GPP, Technical Report, "3rd Generation Partnership Project; Technical Specification Group Services and System Aspects; Vocabulary for 3GPP Specifications (Release 12)", 3GPP TR 21.905 V12.0.0 (Jun. 2013), 64 pp.

3GPP, Technical Specification, "3rd Generation Partnership Project; Technical Specification Group Services and System Aspects; Policy and charging control architecture (Release 12)", 3GPP TS 23.203 V12.1.0 (Jun. 2013), 189 pp.

3GPP, Technical Specification, 3rd Generation Partnership Project; Technical Specification Group Core Network and Terminals; Policy and Charging Control (PCC); Reference points (Release 12), 3GPP TS 29.212 V12.1.0 (Jun. 2013), 200 pp.

3GPP, Technical Specification, "3rd Generation Partnership Project; Technical Specification Group Core Network and Terminals; Policy and Charging Control over Rx reference point (Release 12)", 3GPP TS 29.214 V12.5.0 (Sep. 2014), 61 pp.

* cited by examiner

TRANSCRIPTION OF COMMUNICATION SESSIONS

CROSS REFERENCE TO RELATED APPLICATION

This application is a 35 U.S.C. §371 national stage application of PCT International Application No. PCT/EP2013/066291, filed on Aug. 2, 2013, the disclosure and content of which is incorporated by reference herein in its entirety. The above-referenced PCT International Application was published in the English language as International Publication No. WO 2015/014409 A1 on Feb. 5, 2015.

TECHNICAL FIELD

The present invention relates to telecommunications and in particular to a system, methods, nodes and computer program for transcribing of a communication session in a communication network.

BACKGROUND

During a voice call it is often difficult to understand the other party due to a noisy environment, especially when using mobile equipment in public transport or at public places. Often the only option is to repeat a phrase, increase the voice volume or move to a quieter location. Not understanding the speaking partner may cause that it is not possible anymore to follow the conversation or it is not possible anymore to comment further-on during that call. Misunderstanding the speaking partner may have severe consequences.

Currently, it is possible to translate voice in real time into text and trigger some defined action. An example of this is the SIRI (Speech Interpretation and Recognition Interface) application on Apple iPhone, or the built-in voice control application of a Windows computer.

These allow sampling of a voice command, translating it to text, deriving the meaning of the text, and finally trigger an action on the device. Still, however, it is not possible to follow a phone conversation additionally as written dialog on the device display via a network service.

So a problem with existing solutions for text-to-speech translation is that the service is application or operating system, device and manufacturer dependent. An integrated IMS (IP Multimedia System) service to display any form of transcription is missing in current telephony service offerings.

In telecommunications networks, e.g., in cellular networks as specified by 3GPP (3rd Generation Partnership Project), communication services may be provided on the basis of Internet Protocol (IP) transport channels to a user equipment (UE). One example of such communication services is a voice call established through infrastructure of the network referred to as IP Multimedia Subsystem (IMS). In this case, an IMS node referred to as Proxy Call Session Control Function (P-CSCF) may interact with IP based transport infrastructure of the network, e.g., referred to as Evolved Packet Core (EPC) so as to provide IP based bearers for carrying user plane traffic of the voice call to or from the UE. As for example defined in 3GPP Technical Report 21.905, such bearers may be regarded as an information transmission path having defined characteristics, such as capacity, delay, bit error rate, or the like. Other IP based communication services which may be provided through the IMS are voice call services, video call services, chat services, and mobile TV services.

Accordingly, there is clearly a need for a network based technique which allows for transcribing of a communication session in a communication network.

SUMMARY

In view of the above-said a need exists to provide a solution for an IMS based transcription service, which is a device independent service which pushes the content of a speech call in real time on a display of a user equipment.

The objects defined above are solved by the features of the independent claims. Preferred embodiments of the invention are described in the dependent claims.

According to an exemplary aspect of the invention, a method for transcribing of a communication session in a communication network is provided. The communication network comprises a control server for controlling the communication session, wherein the communication session is established between a user equipment and a remote end. The method comprises receiving, by the control server, a service indication indicating that a transcript of the communication session is requested. The method further comprises sending, by the control server, a transcription request for the communication session to a policy controller of the communication network, if the service indication has been received. The method further comprises determining, by the policy controller, at least one policy rule corresponding to the received transcription request. The method further comprises sending, by the policy controller, the determined at least one policy rule to a packet gateway node of the communication network. The method further comprises providing, by the packet gateway node, based on the at least one policy rule, a transcript or transcript chunk of at least one speech stream related to the communication session.

According to another exemplary aspect of the invention, a method in a user equipment for transcribing of a communication session in a communication network is provided. The communication network comprises a control server for controlling the communication session, wherein the communication session is established between the user equipment and a remote end. The method comprises determining that a subscriber using the user equipment requests a transcript of the communication session. The method further comprises generating a service indication indicating that a transcript of the communication session is requested. The method further comprises sending the service indication to the control server, wherein the service indication is embedded in a signaling controlling the communication session. The method further comprises receiving the transcript from the control server, either as a continuous stream of transcript chunks, or as an entire transcript at the end of the communication session. The method further comprises storing the received transcript in a local memory and displaying the received transcript to the subscriber.

According to another exemplary aspect of the invention, a method in a control server for transcribing of a communication session in a communication network is provided. The communication network comprises a control server for controlling the communication session, wherein the communication session is established between a user equipment and a remote end. The method comprises receiving a service indication indicating that a transcript of the communication session is requested. The method further comprises sending a transcription request for the communication session to a policy controller of the communication network, if a service indication has been received. The method further comprises receiving a transcript from a policy controller, either as a continuous stream of transcript chunks, or as an entire transcript at the end of the communication session. The method further comprises delivering the received transcript to a requesting entity.

According to another exemplary aspect of the invention, a method in a policy controller for transcribing of a communication session in a communication network is provided. The communication network comprises a control server for controlling the communication session, wherein the communication session is established between a user equipment and a remote end. The method comprises receiving a transcription request for the communication session from the control server. The method further comprises determining at least one policy rule corresponding to the received transcription request. The method further comprises sending the determined at least one policy rule to a packet gateway node of the communication network. The method further comprises receiving a transcript or transcript chunk from the packet gateway node. The method further comprises sending the received transcript or transcript chunk to the control server.

According to another exemplary aspect of the invention, a method in a packet gateway node for transcribing of a communication session in a communication network is provided. The communication network comprises a control server for controlling the communication session, wherein the communication session is established between a user equipment and a remote end. The method comprises receiving the at least one policy rule from a policy controller of the communication network. The method further comprises determining, based on the received at least one policy rule, at least one speech stream related to the communication session. The method further comprises transcribing, based on the at least one policy rule, the at least one speech stream related to the communication session. The method further comprises providing, based on the at least one policy rule, a transcript or a transcript chunk of at least one speech stream related to the communication session.

According to another exemplary aspect of the invention, a user equipment for transcribing of a communication session in a communication network is provided. The communication network comprises a control server for controlling the communication session, wherein the communication session is established between the user equipment and a remote end. The user equipment is capable of determining that a subscriber using the user equipment requests a transcript of the communication session. The user equipment is further capable of generating a service indication indicating that a transcript of the communication session is requested. The user equipment is further capable of sending the service indication to the control server, wherein the service indication is embedded in a signaling controlling the communication session. The user equipment is further capable of receiving the transcript from the control server, either as a continuous stream of transcript chunks, or as an entire transcript at the end of the communication session. The user equipment is further capable of storing the received transcript in a local memory and displaying the received transcript to the subscriber.

According to another exemplary aspect of the invention, a control server for transcribing of a communication session in a communication network is provided. The communication network comprises the control server for controlling the communication session, wherein the communication session is established between a user equipment and a remote end. The control server is capable of receiving a service indication indicating that a transcript of the communication session is requested. The control server is further capable of sending a transcription request for the communication session to a policy controller of the communication network, if a service indication has been received. The control server is further capable of receiving a transcript from a policy controller, either as a continuous stream of transcript chunks, or as an entire transcript at the end of the communication session. The control server is further capable of delivering the received transcript to a requesting entity.

According to another exemplary aspect of the invention, a policy controller for transcribing of a communication session in a communication network is provided. The communication network comprises a control server for controlling the communication session, wherein the communication session is established between a user equipment and a remote end. The policy controller is capable of receiving a transcription request for the communication session from the control server. The policy controller is further capable of determining at least one policy rule corresponding to the received transcription request. The policy controller is further capable of sending the determined at least one policy rule to a packet gateway node of the communication network. The policy controller is further capable of receiving a transcript or transcript chunk from the packet gateway node. The policy controller is further capable of sending the received transcript or transcript chunk to the control server.

According to another exemplary aspect of the invention, a packet gateway node for transcribing of a communication session in a communication network is provided. The communication network comprises a control server for controlling the communication session, wherein the communication session is established between a user equipment and a remote end. The packet gateway node is capable of receiving the at least one policy rule from a policy controller of the communication network. The packet gateway node is further capable of determining, based on the received at least one policy rule, at least one speech stream related to the communication session. The packet gateway node is further capable of transcribing, based on the at least one policy rule, at least one speech stream related to the communication session. The packet gateway node is further capable of providing, based on the at least one policy rule, a transcript or a transcript chunk of at least one speech stream related to the communication session.

According to another exemplary aspect of the invention, a system for transcribing of a communication session in a communication network is provided. The communication network (10) comprises a control server (110) for controlling the communication session, wherein the communication session is established between a user equipment (100) and a remote end. The system comprises a user equipment, a control server, a policy controller, and a packet gateway node.

The foregoing and other objects, features and advantages of the present invention will become more apparent in the following detailed description of embodiments of the invention illustrated in the accompanying drawings.

BRIEF DESCRIPTION OF THE DRAWINGS

Further characteristics and advantages of the invention will become better apparent from the detailed description of particular but not exclusive embodiments, illustrated by way of non-limiting examples in the accompanying drawings, wherein.

DETAILED DESCRIPTION

Figure 1:
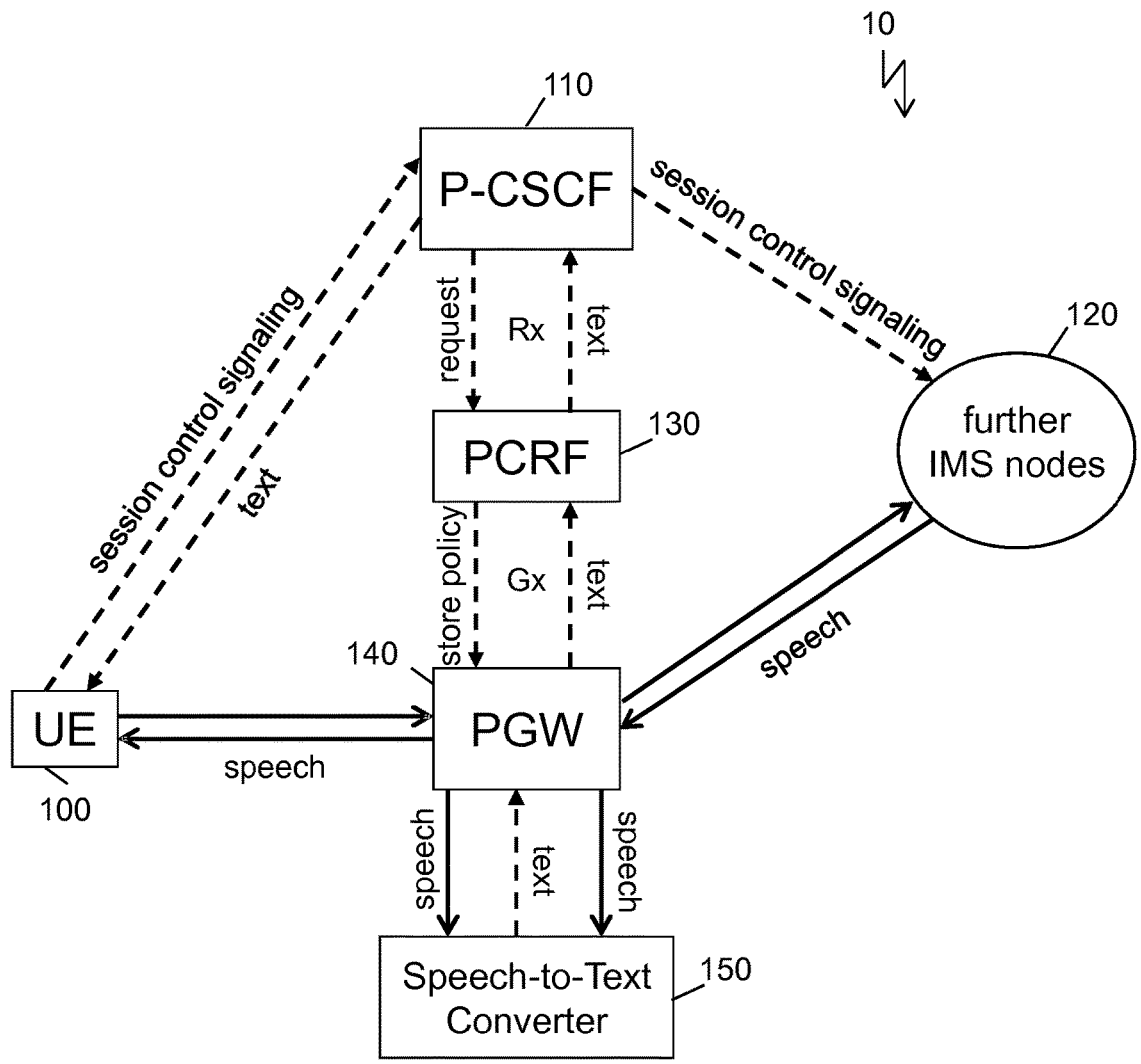
FIG. 1 shows a diagram illustrating a system for transcribing of a communication session in a communication network.

In the following, a system, methods, nodes, and computer programs for transcribing of a communication session in a communication network according to the invention are described in more detail.

Within the context of the present application, the term "communication network" may particularly denote a collection of nodes or entities, related transport links, and associated management needed for running a service, for example a telephony service or a packet transport service. Depending on the service, different node types or entities may be utilized to realize the service. A network operator owns the communication network and offers the implemented services to its subscribers. Typical examples of a communication network are radio access network (such as GSM, 3G, WCDMA, CDMA, LTE, 802.11), mobile backhaul network, or core network (such as IMS, CS, EPC).

Within the context of the present application, the term "control server" refers to a node of the communication network primarily performing control procedures for sessions or calls and services of a subscriber of the communication network. The term typically refers to those entities of the communication network handling control plane, subscriber data, services, or signaling traffic associated with user traffic in the communication network. In a core network a control node may be a MSC, Mobility Management Entity (MME), P-CSCF, S-CSCF (Serving Call Session Control Function), or TAS (Telephony Application Server) nodes.

Within the context of the present application, the term "user equipment" refers to a device for instance used by a person for his or her personal communication. It can be a telephone type of device, for example a fixed telephone or a SIP (Session Initiation Protocol) phone, cellular telephone, a mobile station, cordless phone, or a personal digital assistant type of device like laptop, notebook, notepad equipped with a wireless data connection. The UE may also be associated with non-humans like animals, plants, or even machines. A UE may be equipped with a SIM (Subscriber Identity Module) comprising unique identities such as IMSI (International Mobile Subscriber Identity) and/or TMSI (Temporary Mobile Subscriber Identity) associated with a subscriber using the UE. The presence of a SIM within a UE customizes the UE uniquely with a subscription of the subscriber.

Within the context of the present application, the term "further IMS nodes" refers to communication network nodes belonging to a typical IMS network and which are needed for session handling. Examples for IMS session handling nodes are I-CSCF (Interrogating Call Session Control Function), S-CSCF, TAS, BGCF (Border Gateway Control Function), MGCF (Media Gateway Control Function), TRF (Transit and Roaming Function), or IBCF (Interconnection Border Control Function). This may also include subscriber databases such as the HSS (Home Subscriber Server), and media plane handling nodes such as MGW (Media Gateway), MRFP (Media Resource Function Platform), SBG (Session Border Gateway), or TrGW (Transit GateWay).

Within the context of the present application, the term "remote end" refers to equipment at the other end of the session. So when looking at the originating access, the remote end refers to the equipment at the terminating access. When looking at the terminating access, the remote end is the equipment at the originating access. The equipment located at the remote end may be a user equipment, or a machine, as defined in the definition of user equipment above.

Within the context of the present application, the term "policy controller" refers to a control server handling primarily policy and charging rules related functions. So a PCRF (Policy and Charging Rules Function) may be an embodiment of such a policy controller, which is a 3GPP standardized part of the EPC. The PCRF communicates via an interface called Rx with an application function. This application function may be a control server for handling session control in IMS, such as the P-CSCF. The PCRF communicates via an interface called Gx with a PGW (Packet GateWay) for applying PCC (policy and charging control) bearer handling rules.

Within the context of the present application, the term "packet gateway" refers to a media plane related node primarily handling the forwarding of packets. So a PGW may be an embodiment of such a packet gateway, which is a 3GPP standardized part of the EPC. The PGW communicates via an interface called Gx with a PCRF for receiving PCC bearer handling rules.

Within the context of the present application, the term "speech stream" refers to a continuous flow of data packets carrying media related to a communication session. The media may be an audio stream of speech or voice flowing from one end of the communication session to the remote end. In a wider sense the speech stream may also be embedded into a video, wherein the speech stream represents the audio part thereof. For a communication session, the speech stream may be unidirectional. In this case there is a only single speech stream related to the communication session. For conversational communication session two speech streams may be related to the communication session, one for each direction. For stereo or multi-channel applications even more than one speech streams may exist per direction.

Within the context of the present application, the term "speech-to-text converter" refers to an application function which is able to recognize the spoken words of a speech stream and converts the recognized words into a corresponding text. As this is a high capacity consuming process, a speech-to-text application may typically be located on a separate node or network element with high processing capacity, but may also be co-located or integrated with EPC packet handling nodes.

Within the context of the present application, the term "transcription" refers to a process of representing spoken language in written form. So transcription means a conversion of the speech contained in a speech stream into a textual representation. This transcription may also include in addition to the original textual representation also a change in language. So the involved step would be first to recognize the meaning of the speech stream, then generating a corresponding meaning in a different target language, and finally converting the result into a corresponding textual representation in the target language.

Within the context of the present application, the term "transcript" refers to the result of a transcription, which may be provided as one entire transcript covering the entire communication session, or as transcript chunks so segments of the entire transcript. The transcript then constitutes the sum of all transcript chunks related to one transcription.

Referring now to FIG. 1, this figure shows a diagram illustrating a system for transcribing of a communication session in a communication network 10 according to an embodiment.

The UE 100 has an established IMS session ongoing, wherein the UE 100 may be the originator of the session, or as well the recipient of the session. The IMS session is established via the P-CSCF acting as an IMS control server and via further IMS nodes 120 towards a remote end.

The media plane related to the ongoing IMS session is routed from the UE 100 to the PGW 140 and from there to the further IMS nodes 120 and towards the remote end. Since this embodiment assumes that the session is of conversational nature, there are two media streams established, the first from the UE 100 to the remote end, the second from the remote end to the UE 100. Consequently speech streams can flow between the two end points of the IMS session.

The UE 100 may be connected via a packet radio access such as 3GPP UTRAN (Universal Mobile Telecommunications System Terrestrial Radio Access Network) or 3GPP LTE (Long Term Evolution) to an EPC, wherein the shown PGW 140 is part of the EPC. The EPC may further comprise a SGW (Serving GateWay) which is not depicted in the figure due to simplification reasons.

The link between the session control established from the UE 100 via the P-CSCF 110 and the further IMS nodes 120 is realized via the 3GPP PCC architecture comprising a PCRF. The interface between the IMS control server P-CSCF 110 and the PCRF is called Rx in 3GPP. The 3GPP PCC architecture also foresees a Policy Control Enforcement Function (PCEF), which is realized in this embodiment as an internal function of the PGW 140 and is omitted in the figure for simplification reasons.

A PCC architecture according to 3GPP TS 23.203 is assumed in this embodiment. In particular, the corresponding functionalities as implemented at the control server 110, assumed to implement a P-CSCF, at the policy controller 130, assumed to implement a PCRF, and the gateway node 140, assumed to implement a PGW. As illustrated, the control server 110 implements a transcription service control, the policy controller implements a transcription service support, and the gateway node 140 implements a PCEF and a transcription service. The policy controller 130 may perform policy control decision and/or flow based charging control. The policy controller 130 may also provide network control regarding detection of service data flow, gating, Quality of Service (QoS), and/or flow based charging towards the PCEF. For this purpose, the policy controller 130 may signal policy rules, in 3GPP TS 23.203 referred to as PCC rules, to the PCEF. The PCEF may perform service data flow detection, policy enforcement and flow based charging functionalities, which is typically accomplished by applying the PCC rules as signaled by the policy controller 130. Further, the PCEF may also implement functionalities of packet inspection, such as DPI (Deep Packet Inspection), and service classification. In this way data packets may be classified according to PCC rules defined in the PCEF and be assigned to a certain service. As mentioned above, such functionalities may be efficiently utilized for identifying the user plane traffic of the session for which a transcription service needs to be performed. The PCEF is not shown in the figure as it is assumed to be integrated into the PGW 140. The interface between the PCRF 130 and the PGW 140 called Gx in 3GPP.

FIG. 1 shows also a method for transcribing of a communication session in a communication network 10. The communication network 10 comprises a control server 110, implemented as a P-CSCF 110, for controlling the communication session, wherein the communication session is established between a UE 100 and further equipment at a remote end. The communication session is established via further IMS nodes 120. SIP may be used as a control signaling protocol.

In a first step of the method, the P-CSCF 110 receives a service indication indicating that a transcript of the communication session is requested.

The P-CSCF 110 receives the service indication from a requesting entity, wherein the requesting entity may be a subscriber using the UE 100 to request a transcript of the communication session via the UE 100. The requesting entity may by alternative be a further node of the communication network 10 requesting a transcription of the communication session. So the P-CSCF 110 receives a service indication either from the UE 100 or a further node of the communication network 10.

The service indication received by the P-CSCF 110 may also specify details on how the resulting transcript of the ongoing communication session shall be provided. So the service indication may indicate that the transcript shall be provided as a continuous stream of transcript chunks. By alternative, the service indication may indicate that an entire transcript shall be provided after the communication session has ended.

The transcription may be a conversion of at least one speech stream to a corresponding text. In addition to the conversion to text, the transcription may involve a change of a language between the at least one speech stream and the corresponding text, or in other words a translation.

In order to send the service indication indicating that a transcript of the communication session is requested, the UE 100 may have to perform certain steps. First the UE 100 has to determine that a subscriber using the UE 100 requests a transcript of the communication session. The subscriber may type a command on the keypad or touchscreen of the UE to trigger the transcription service. The transcription service may also be automatically triggered for every session (e.g. if the subscriber is handicapped) or for certain destinations (e.g. when calling an answering machine or automatic voice prompting system) or certain called parties.

Having detected that the subscriber wishes to invoke the transcription service, the UE 100 generates a service indication indicating that a transcript of the communication session is requested.

Then the UE 100 sends the service indication to the P-CSCF 110, wherein the service indication is embedded in a signaling controlling the communication session. The service indication may be an indication in a session description being embedded in the signaling controlling the communication session.

If the service indication has been received by the P-CSCF 110, the P-CSCF 110 sends a transcription request for the communication session to a PCRF 130 of the communication network 10. In particular, the transcription request for the communication session to a PCRF 130 may be comprised in an authorization request for the communication session. The authorization request may be an initial Authentication/Authorization Request (AAR) command of the Diameter based protocol implemented on the Rx interface between the P-CSCF 110 and the PCRF 130. The request typically includes information describing the session for which authorization is requested, e.g., type of service, IP address of the UE 100, codec data, or the like. The authorization request may include such information in Attribute Value Pairs (AVPs) as defined in 3GPP TS 29.214.

In a further step, the PCRF 130 receives a transcription request for the communication session from the P-CSCF 110 and determines at least one policy rule corresponding to the received transcription request. The transcription request may also be comprised in an authorization request for the communication session. For determining at least one policy rule corresponding to the received transcription request, the PCRF 130 may utilize information from the transcription request, but also other information available to the PCRF 130, e.g., from a subscriber database such as HSS, or the like. The PCC rules have the purpose of configuring the PGW 410 to identify and suitably control user plane traffic of the IMS session, e.g., by providing a bearer for carrying media plane traffic of the IMS session and applying packet filters and/or DPI for directing the user plane traffic to this bearer.

In a further step the PCRF 130 sends the determined at least one policy rule to a PGW 140 of the communication network 10.

By sending at least one policy rule to the PGW 140, the PCRF 130 indicates the PCC rules to the PGW 140. This may involve sending data for installing the PCC rules into the PGW 140. Further, the PCC rules may also be preconfigured in the PGW 140 and be activated by the indication. The message sending at least one policy rule may be a Re-Authorization Request (RAR) command of the Diameter based protocol implemented on the Gx interface between the PCRF 130 and the PGW 140, and the PCC rules may be indicated by corresponding AVPs of the message, e.g., as defined in 3GPP TS 29.212. As described in 3GPP TS 29.212, the RAR command may be used for unsolicited provisioning of PCC rules to the PCEF. In the PGW 140, the PCEF may use the PCC rules for identifying and controlling the user plane traffic of the IMS session, e.g., by applying packet filters and/or DPI for directing the user plane traffic to the desired bearer. The PGW 140 may also perform further procedures for setting up or configuring the bearer over a S5/S8, S1-U, and Uu interfaces as defined by 3GPP.

In the illustrated example, the message sending at least one policy rule is further used for providing an indication to the PGW 140 that session transcription is required for the media plane traffic of the IMS session as identified by the PCC rules. This indication may be included in a further AVP of the message.

In a further step the PGW 140 receives the at least one policy rule from a PCRF 130 of the communication network 10. Then the PGW 140 determines, based on the received at least one policy rule, at least one speech stream related to the communication session. In this embodiment the PGW 140 identifies the two speech streams related to the two communication directions, wherein the speech stream related to the communication session is at least one of the following, a speech stream from the UE 100 towards the further equipment at the remote end, or a speech stream from the further equipment at the remote end towards the UE 100.

According to the session transcription indication, the PGW 140 then starts transcribing of the at least one speech stream related to the communication session. The functionality of transcribing speech streams and converting them into text may be an integrated function of the PGW 140, wherein this integrated function is activated as a result of the reception of the session transcription indication in the PGW 140, using the identified speech streams as input. So the PGW 140 provides, based on the at least one policy rule, a transcription of at least one speech stream related to the communication session.

This embodiment however illustrates the option that the transcribing is done by an external function, a speech-to-text converter 150. So the packet PGW 140 is transcribing the at least one speech stream by forwarding a copy of the at least one speech stream to a speech-to-text converter 150 of the communication network 10 and receives the resulting transcript from the speech-to-text converter 150.

Since the subscriber may indicate the option that the transcript shall be provided as a continuous stream of transcript chunks, or by alternative, that an entire transcript shall be provided after the communication session has ended, also the input sent by the PGW 140 may vary in this embodiment.

In the case that a continuous stream of transcript chunks is requested, the copy of the at least one speech streams is partitioned into segments by the PGW 140 before forwarding to the speech-to-text converter 150, and the speech-to-text converter 150 returns a transcript chunk for each segment to the PGW 140. The partitioning into segments of the copy of a speech stream may be done by the PGW by applying a fixed time interval. Alternatively, the interval may be variable in a way that the segment will always terminate between spoken words. This may be achieved for example by detecting the short periods of silence between words. In a similar way also the end of a sentence may be detected, so that the segment will always terminate between entire sentences. Yet another alternative for the segmentation may be to correlate the two speech streams of the conversational session. A conversational session is characterized by the fact that at a given time only one of the two speaking partners would speak, while the other is silent and would listen. So the advantageous alternative segmentation would be to partition the speech streams at the points where the speaking person alters.

In the case that an entire transcript shall be provided after the communication session has ended, the PGW 140 receives an entire transcript of the at least one speech stream from speech-to-text converter 150 when the communication session ends. In order to achieve this, the PGW 140 would indicate to the speech-to-text converter 150 that the session has ended. This may be done by a separate control signaling from the PGW 140 to the speech-to-text converter 150, or simply by the PGW 140 stopping the copy of the at least one speech stream towards the speech-to-text converter 150. The speech-to-text converter 150 then can determine that the input stream for the transcription has ended, and conclude that the session has ended and provide the entire transcript of the at least one speech stream to the PGW 140.

Then the PGW 140 provides the transcription to the requesting entity, wherein the transcript of the at least one speech stream is provided by sending the transcript from the PGW 140, via the PCRF 130, and via the P-CSCF 110 to a requesting entity. By alternative, the transcription may also be sent by the PGW 140 directly to the requesting entity.

So in the next step the PGW 140 forwards a received transcript, may it be the entire transcript of the session, or a transcript chunk, to the PCRF 130.

The PCRF 130 receives a transcript or transcript chunk from the PGW 140 and sends the received transcript or transcript chunk to the P-CSCF 110. The PCRF 130 may receive the a transcript or transcript chunk from the PGW 140 in a Re-Authorization Answer (RAA) command of the Diameter based protocol implemented on the Gx interface between the PCRF 130 and the PGW 140. This indication may be included in a further AVP of the message.

The P-CSCF 110 receives a transcript from a PCRF 130, either as a continuous stream of transcript chunks, or as an entire transcript at the end of the communication session and delivers the received transcript to a requesting entity. As described above, a requesting entity may either be the UE 100 or a further node of the communication network 10. The P-CSCF 110 may receives the transcript or transcript chunk from the PCRF 130 in a Authentication/Authorization Answer (AAA) command of the Diameter based protocol implemented on the Rx interface between the P-CSCF 110 and the PCRF 130.

If the requesting entity is a further node of the communication network 10, the P-CSCF 110 returns the received transcript as a response to the request of the further node.

If the requesting entity is a UE 100, the P-CSCF 110 returns the received transcript, wherein the delivering of the received transcript may be done by opening an instant messaging session with the UE 100 and delivering the received transcript chunks as text messages within the instant messaging session. This instant messaging session may be a new session between the P-CSCF 110 and the UE 100.

By alternative, if the requesting entity is a UE 100, the P-CSCF 110 may return the received transcript, wherein the delivering of the received transcript is done by sending the entire transcript as a text message to the UE 100 within an established signaling connection.

Finally the UE 100 receives the transcript from the P-CSCF 110, either as a continuous stream of transcript chunks, or as an entire transcript at the end of the communication session. The UE 100 stores the received transcript in a local memory and displays the received transcript to the subscriber.

The UE 100 may receive the transcript from the P-CSCF 110, wherein the transcript is received from the P-CSCF 110 via an instant messaging session and wherein the transcription chunks are received as text messages within the instant messaging session.

By alternative, the UE 100 may receive the transcript from the P-CSCF 110, wherein the entire transcript is received from the P-CSCF 110 as a text message within the signaling controlling the communication session.

Figure 2:
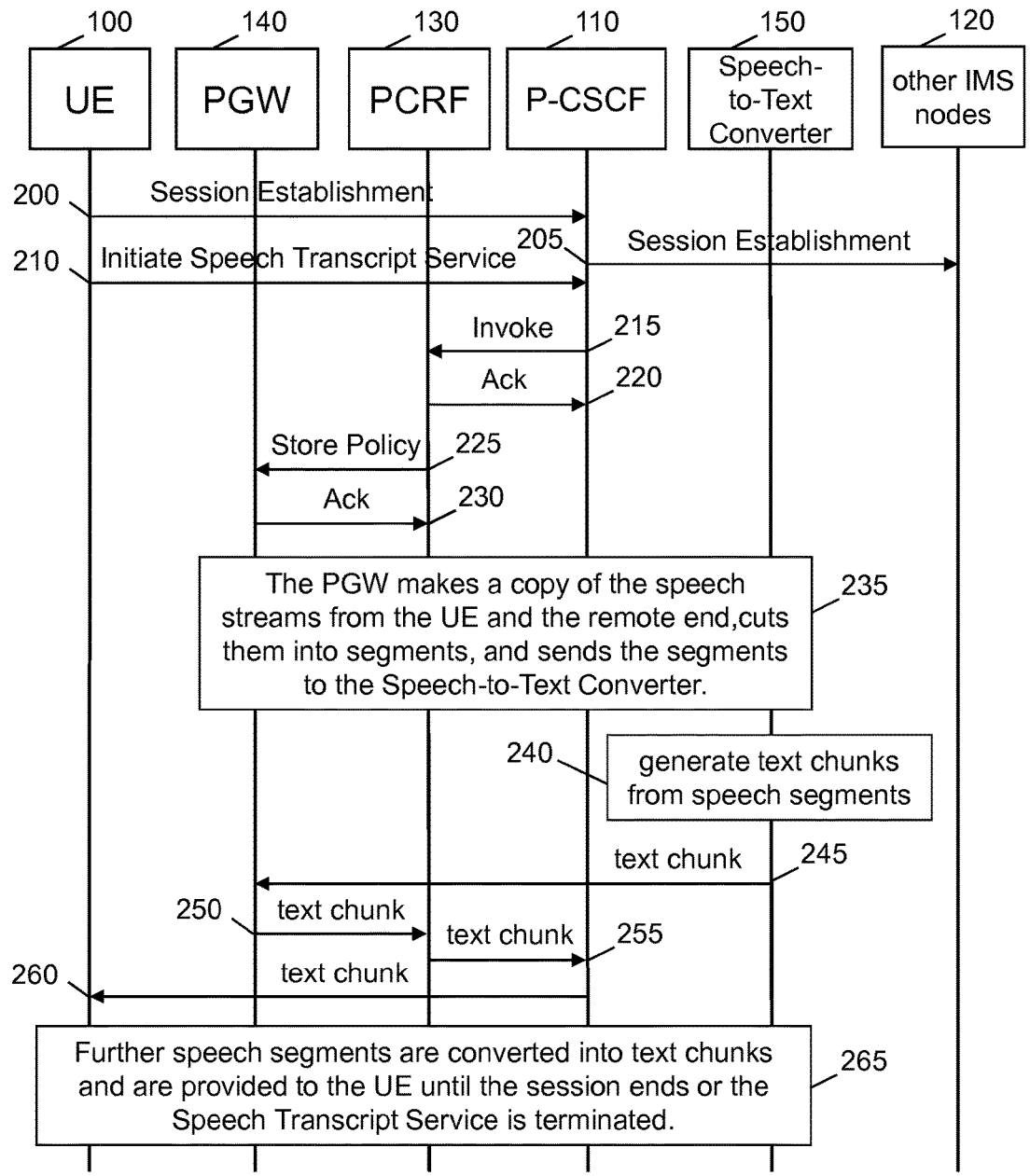
FIG. 2 shows a procedure flow diagram illustrating a procedure of transcribing of a communication session in a communication network according to the invention.

Referring now to FIG. 2, this figure shows a procedure flow diagram illustrating a procedure of transcribing of a communication session in a communication network according to an embodiment.

The procedure flow shows the signaling interactions between the UE 100, PGW 140, PCRF 130, P-CSCF 110, speech-to-text converter 150, and other IMS nodes 120 of the communication network 10. This procedure flow now shows the case that a subscriber using a UE 100 requests to receive a transcript of the session in a continuous stream of text chunks during the session.

The procedure flow starts with the UE 100 establishing 200 an IMS session towards the P-CSCF 110. The P-CSCF 110 continues in 205 the IMS session establishment towards the other IMS nodes 130 and from there to the remote end equipment. The session establishment signaling may be based on a SIP signaling protocol and SIP procedures. For simplification reasons the IMS session establishment signaling is simplified. So after message 205 and corresponding responses the IMS session is established between the UE 100, via the P-CSCF 110, the other IMS nodes 120, and the remote end equipment. The establishment direction may also be of reverse order, so that the UE 100 would be the recipient of the IMS session establishment request.

At some point in time the subscriber using the UE 100 decides that he/she wants to receive a transcript of the established and ongoing IMS session, and gives corresponding commands to the UE 100. As described above, the UE 100 may also decide to trigger a transcript of the established and ongoing IMS session, without interaction with the subscriber, based on preconfigured information such as destination or type of session. Associated with the transcription trigger there may be an indication whether the transcription is requested as a single transcript at the end of the session, or as continuous transcript chunks during the ongoing session. Furthermore, a translation of the transcript into a different language may be requested.

The UE 100 then sends a request to initiate a speech transcript service 210, which corresponds to a service indication indicating that a transcript of the communication session is requested. This request may be sent as signalling within the control signalling of the established session. If SIP is used as control signalling, the request may be a SIP Options or part of the SDP (Session Description Protocol) describing the characteristics of the IMS session.

The P-CSCF 110 receives the request to initiate a speech transcript service 210 and sends a corresponding invocation message 215 to the PCRF. This invocation message 215 corresponds to a transcription request for the communication session. The invocation message 215 may be an AAR diameter message with a new AVP element and complies with the Rx definitions of the 3GPP specification.

The PCRF 130 receives the invocation message 215 and may acknowledge the reception of the request in message 220. The P-CSCF 110 receives this acknowledgment message 220.

In the next step the PCRF 130 determines policy rule(s) corresponding to the received transcription request and stores in message 225 the determined policy rule(s) into the PGW 140. The message 225 to store the determined policy rule(s) may be an RAR diameter message with a new AVP element and complies with the Gx definitions of the 3GPP specification.

The PGW 140 receives the policy rule(s) corresponding to the transcription request in message 225 and may acknowledge the reception in message 230. The PCRF 130 receives this acknowledgment message 230.

The PGW 140 then determines the speech streams related to the ongoing IMS session. In the next step 235 the PGW 140 makes a copy of the determined speech streams from the UE 100 and the remote end, cuts them into segments, and sends the segments to the speech-to-text converter 150.

The speech-to-text converter 150 receives the segmented speech streams and generates in 240 corresponding text chunks. One segment of the speech stream is thereby converted into one text chunk. The speech-to-text converter 150 then sends each text chunks in a dedicated message 245 to the PGW 140. If a translation of the transcript has been requested, the speech-to-text converter 150 may translate each text chunk before sending them in a dedcated message 245 to the PGW 140.

The PGW 140 receives a text chunk in message 245 and immediately forwards the text chunk in a message 250 to the PCRF 130. A diameter message with a new AVP element and compliant with the Gx definitions of the 3GPP specification may be used to transport the text chunk.

The PCRF 130 receives a text chunk in message 250 and immediately forwards the text chunk in a message 255 to the P-CSCF 110. A diameter message with a new AVP element and compliant with the Rx definitions of the 3GPP specification may be used to transport the text chunk.

The P-CSCF 110 receives a text chunk in message 255 and forwards the text chunk in message 260 to the UE 100.

In order to deliver text chunks to the UE 100, the P-CSCF 110 may send the text chunks as text messages within the control signalling of the communication session. If a SIP protocol is used as session control signalling, a SIP Message message may be used. As a alternative, the P-CSCF 110 may open an instant messaging or chat session with the UE 100 and deliver the text chunks as instant messages within that chat session.

The UE 100 receives a text chunk in message 260. The UE then stores the text chunk in a local memory and displays the text chunk to the subscriber on the display. The UE 100 may format the display of the text chunks in a decent way so that is is easily visible what each party of the session has said during the conversation.

Further speech segments are converted into text chunks and are provided to the UE 100 until the session ends or the Speech Transcript Service is terminated. This repitition is represented by box 265.

The transcription of the session may be terminated by the subscriber at any point of time from the UE 100. This is not shown in the figure for simplification reasons. A corresponding indication may be transferred in a similar way from the UE 100, via P-CSCF 110, PCRF 130, to the PGW 140. The PGW 140 may then stop sending a copy of the speech streams to the speech-to-text converter 150. In a similar way the transcription may be ended by terminating the ongoing IMS session.

Figure 3:
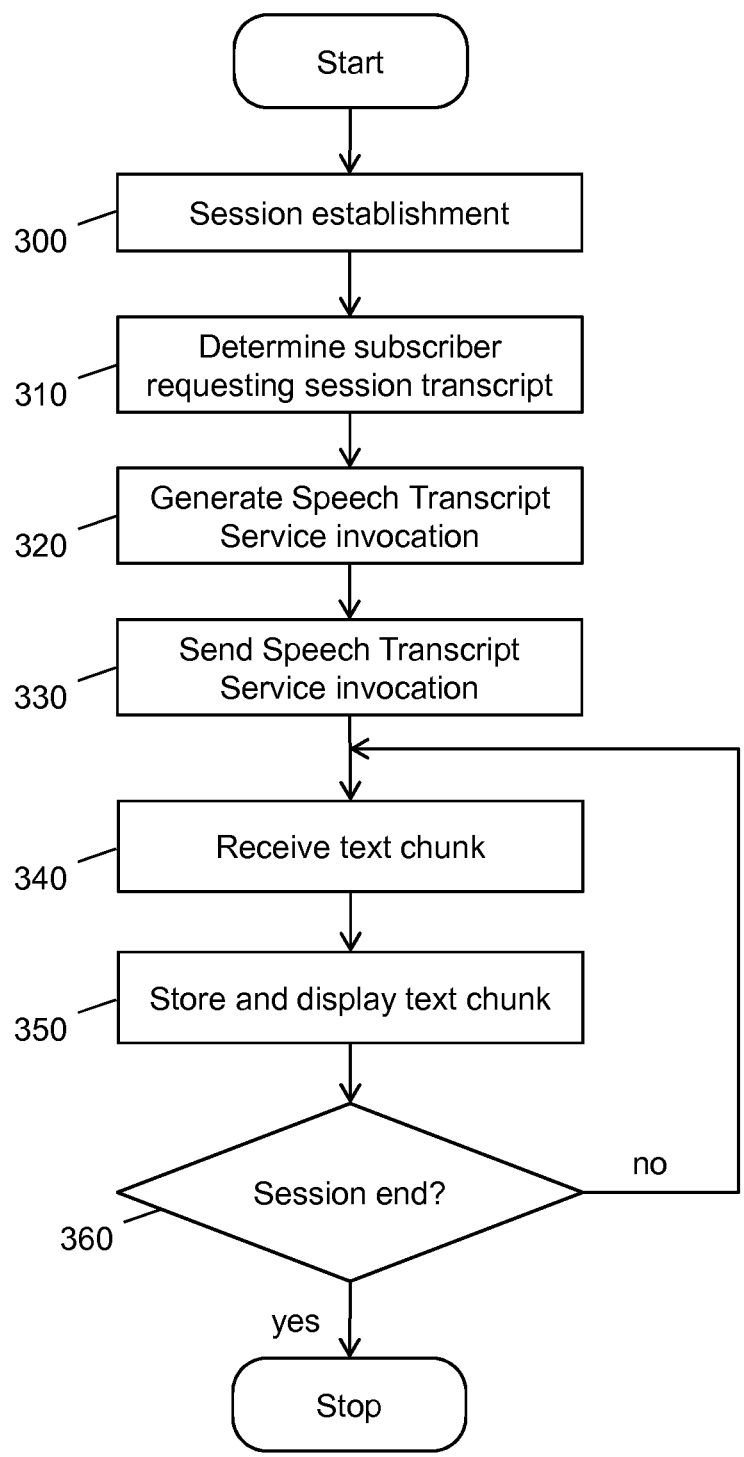
FIG. 3 shows a flow diagram for transcribing of a communication session in a communication network in a user equipment according to the invention.

Referring now to FIG. 3, this figure shows a flow diagram for transcribing of a communication session in a communication network in a UE 100 according to an embodiment.

The flow in the UE 100 starts with an establishment 300 of a session, which may be an IMS session, which may be controlled using a SIP protocol.

After the session is established and is ongoing, at any point of time the subscriber using the UE 100 may trigger an invocation of a Speech Transcript Service. The UE 100 determines this in step 310 and generates in step 320 a corresponding Speech Transcript Service invocation indication and sends this Speech Transcript Service invocation indication in step 330 to the P-CSCF 110. The UE 100 may determine an invocation of a Speech Transcript Service also without interaction with the subscriber, for example based on the type of the session (speech session, video session, conversational session or the like), the destination or source of the session (automatic prompting systems, answering machines, or certain called/calling subscribers or the like), or simply for all sessions (handicapped subscriber or the like).

From now on the UE 100 may receive in step 340 text chunks from the P-CSCF 110. The UE 100 then in step 350 stores the received text chunk into local memory and shows the received text chunk on the display to the subscriber.

The UE 100 is prepared to repeat the steps 340 and 350 until the Speech Transcript Service is terminated or until the session ends. A corresponding check whether the session has ended is shown as step 360.

If the session has ended, or the Speech Transcript Service is terminated, the flow in the UE 100 ends.

Figure 4:
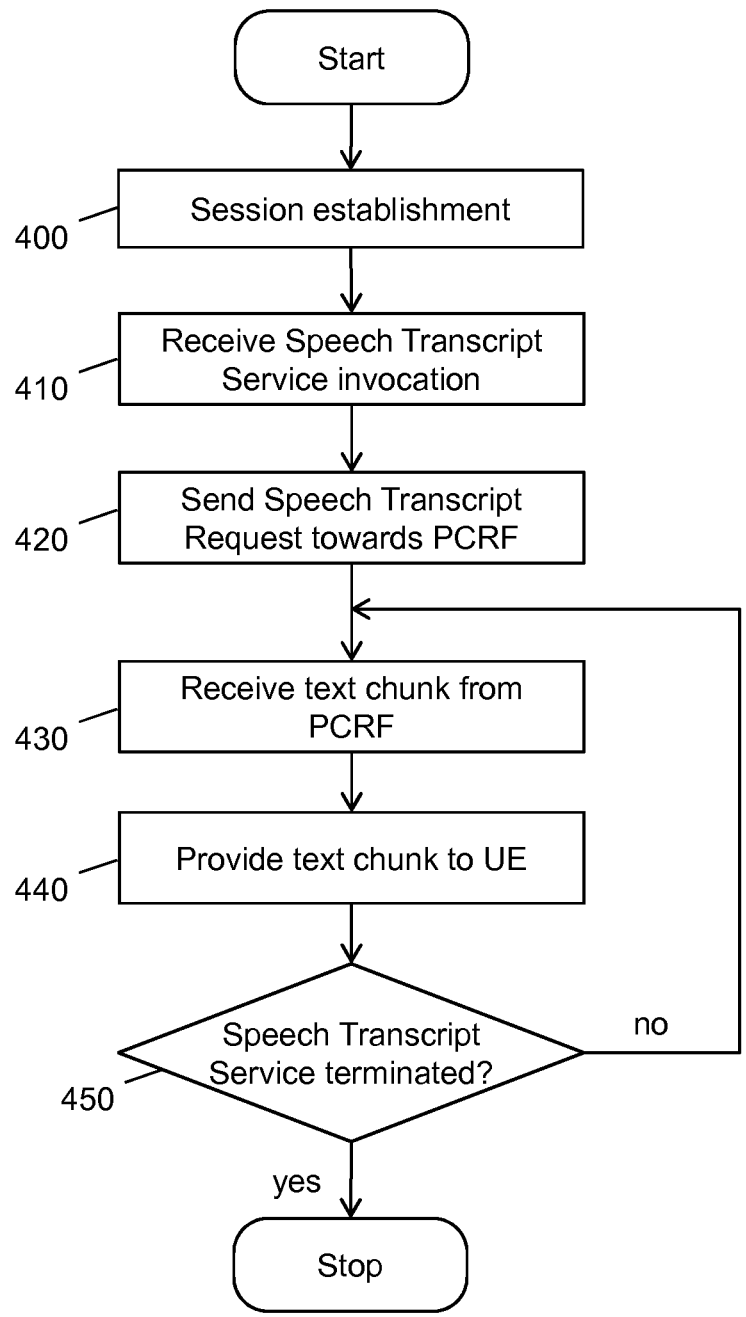
FIG. 4 shows a flow diagram for transcribing of a communication session in a communication network in a control server according to the invention.

Referring now to FIG. 4, this figure shows a flow diagram for transcribing of a communication session in a communication network in a P-CSCF 110 according to an embodiment.

The flow in the P-CSCF 110 starts with an establishment 400 of a session, which may be an IMS session, which may be controlled using a SIP protocol.

After the session is established and is ongoing, at any point of time the P-CSCF 110 may receive an invocation request for a Speech Transcript Service from a UE 100. The P-CSCF 110 determines this in step 410 and generates a corresponding Speech Transcript Request indication and sends this Speech Transcript Request indication in step 420 to the PCRF 130.

From now on the P-CSCF 110 may receive in step 430 text chunks from the PCRF 130. The P-CSCF 110 then in step 440 provides the received text chunks to the UE 100.

The P-CSCF 110 is prepared to repeat the steps 430 and 440 until the Speech Transcript Service is terminated, which may also be caused by the end of the session. A corresponding check whether the Speech Transcript Service is terminated is shown as step 450.

If the Speech Transcript Service is terminated the flow in the P-CSCF 110 ends.

Figure 5:
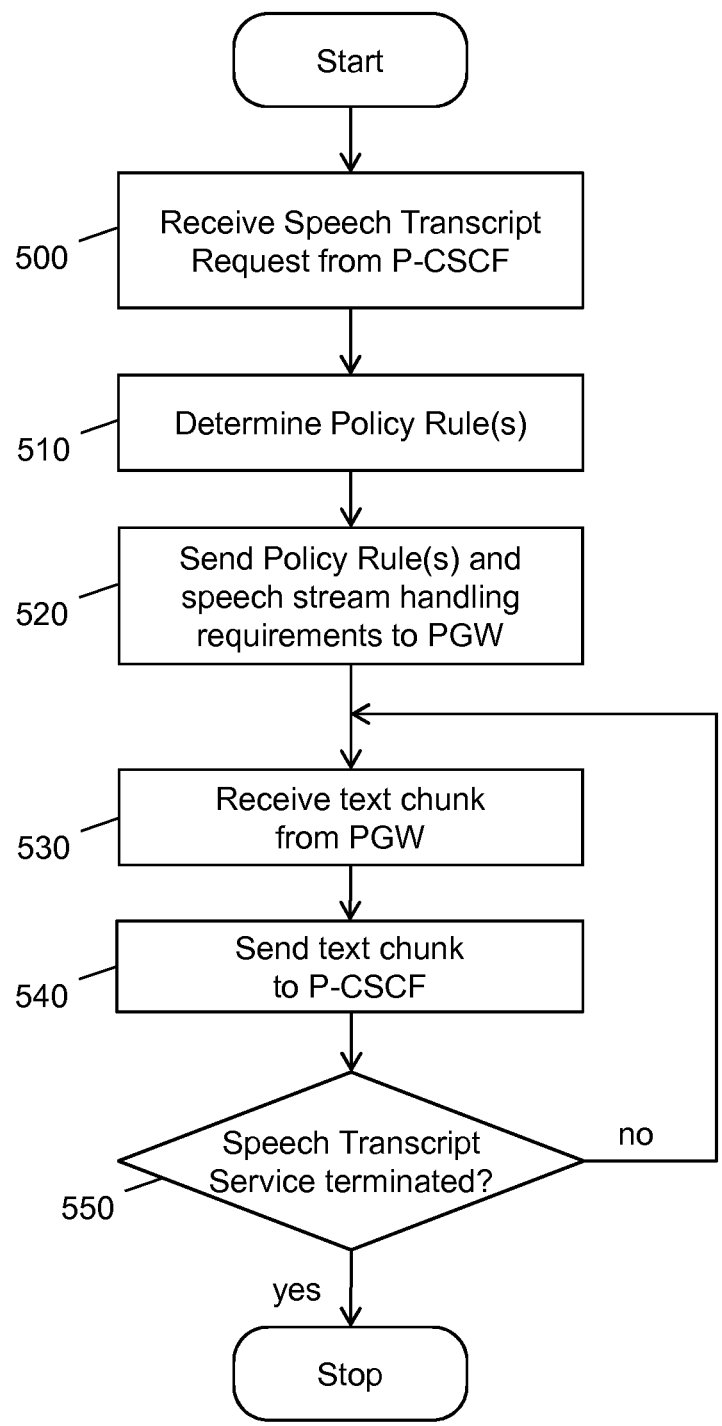
FIG. 5 shows a flow diagram for transcribing of a communication session in a communication network in a policy controller according to the invention.

Referring now to FIG. 5, this figure shows a flow diagram for transcribing of a communication session in a communication network in a PCRF 130 according to an embodiment.

The flow in the PCRF 130 starts with the reception 500 of a Speech Transcript Request indication from the P-CSCF 110.

In the next step the PCRF 130 determines 510 policy rule(s) corresponding to the received transcription request and sends 520 the determined policy rule(s) and related speech stream handling requirements corresponding to a speech transcript service to the PGW 140.

From now on the PCRF 130 may receive in step 530 text chunks from the PGW 140. The PCRF 130 then in step 540 sends the received text chunks to the P-CSCF 110.

The PCRF 130 is prepared to repeat the steps 530 and 540 until the Speech Transcript Service is terminated, which may also be caused by the end of the session. A corresponding check whether the Speech Transcript Service is terminated is shown as step 550.

If the Speech Transcript Service is terminated the flow in the PCRF 130 ends.

Figure 6:
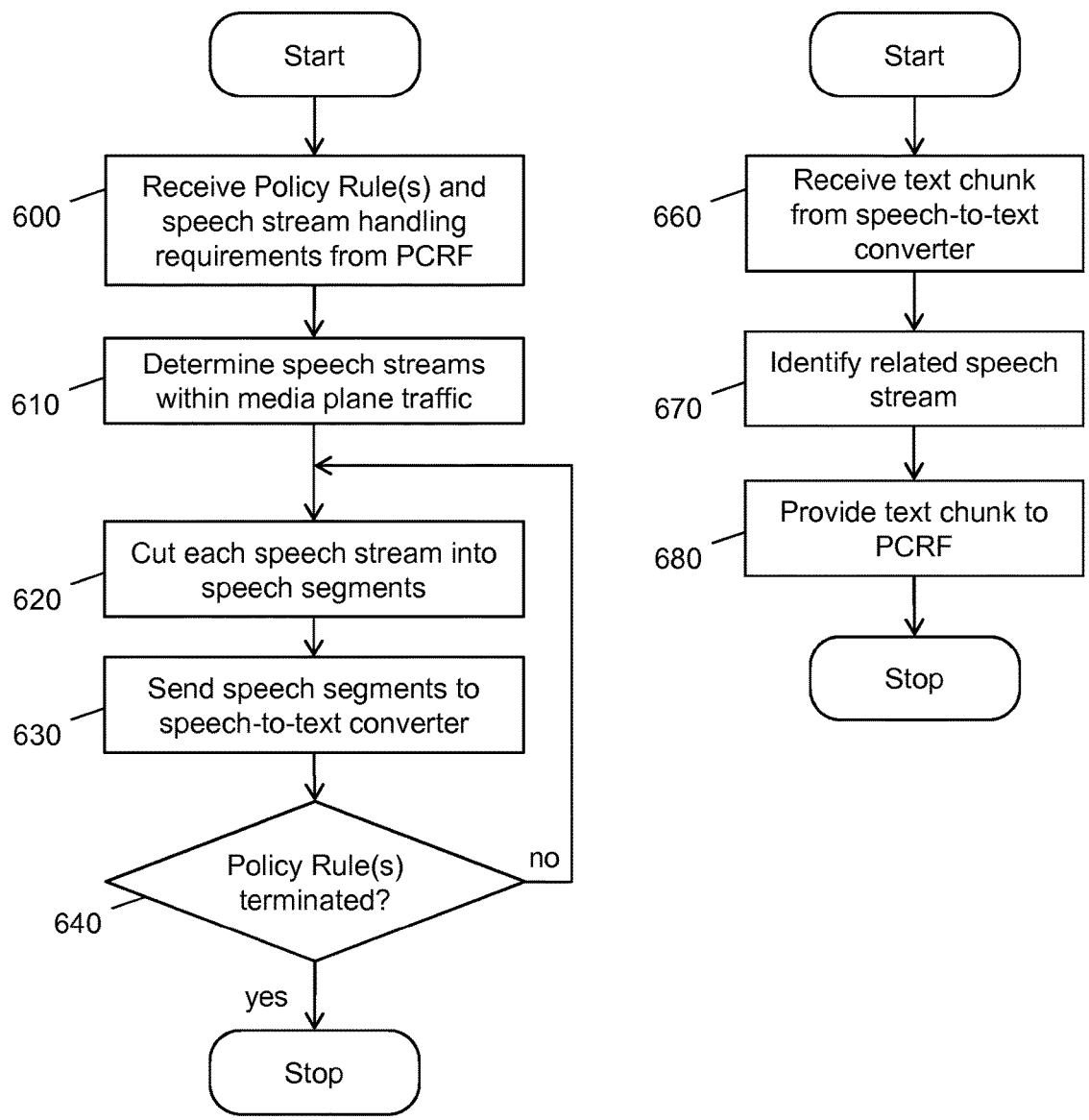
FIG. 6 shows a flow diagram for transcribing of a communication session in a communication network in a packet gateway node according to the invention.

Referring now to FIG. 6, this figure shows a flow diagram for transcribing of a communication session in a communication network in a PGW 140 according to an embodiment.

The flow in the PGW 140 starts with the reception 600 of policy rule(s) speech stream handling requirements corresponding to a speech transcript service.

The PGW 140 then determines 610, based on the received policy rule(s), speech streams within the media plane traffic corresponding to the ongoing session.

The PGW 140 then generates a copy of the determined speech streams and cuts 620 them into segments, and sends 630 the segments to a speech-to-text converter 150.

The PGW continues to generating a copy of the determined speech streams, cutting 620 them into segments, and sending 630 the segments to the speech-to-text converter 150, until the corresponding policy rule(s) and speech stream handling requirements corresponding to a speech transcript service are terminated, which may be caused by the end of the session. A corresponding check is shown as step 640.

If the policy rule(s) and speech stream handling requirements are terminated, the flow in the PGW 140 ends.

In parallel to the process of repetitive cutting 620 a copy of the determined speech streams into segments, and sending 630 the segments to the speech-to-text converter 150, a parallel process may be started to handle the text chunks received from the speech-to-text converter 150.

This parallel process may be spawned when entering the loop of steps 620 to 640 and may be killed when a result of check 640 is yes. The parallel flow starts when the PGW 140 receives 660 a text chunk from the speech-to-text converter 150.

In step 670 the PGW 140 identifies the related speech stream and also the related session to which the speech stream belongs, which may be done based on a source address of the speech-to-text converter 150 or an identifier being send to the speech-to-text converter 150 together with the first speech stream segment for transcription, and the speech-to-text converter 150 returning the identifier together with each transcript chunk to the PGW 140, wherein the identifier identifies the speech stream and the related session.

In the next step the PGW 140 provides 680 the received text chunk to the PCRF 130 and the flow ends.

Figure 7:
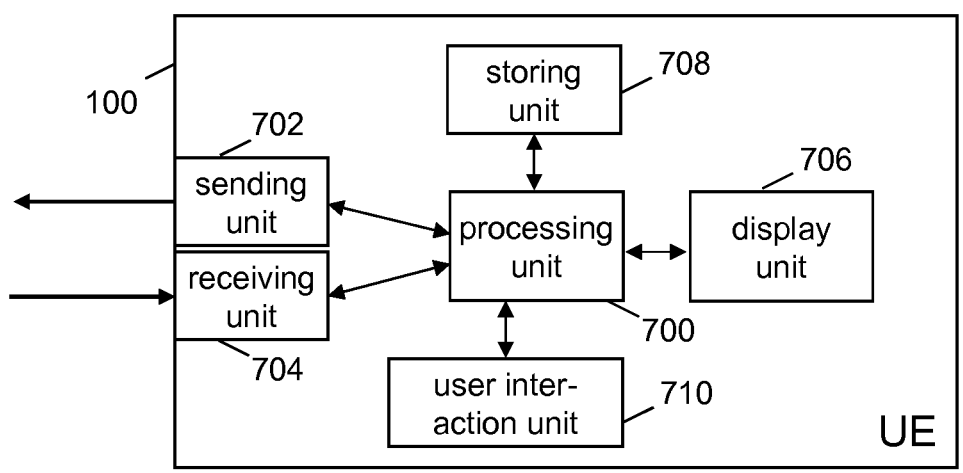
FIG. 7 is a block diagram illustrating a user equipment according to the invention.

Now referring to FIG. 7, this figure shows a block diagram illustrating a UE according to an embodiment. The illustrated entity may correspond to the UE 100. The UE 100 may be adapted to perform one or more steps of the above described method shown in FIG. 3.

The UE 100 may comprise a number of functional units, which are described in further detail below and which are adapted to perform respective method steps.

A processing unit 700 of the UE 100 may be adapted to determine that a subscriber using the UE 100 requests a transcript of the communication session. The processing unit 700 may be further adapted to generate a service indication indicating that a transcript of the communication session is requested. The processing unit 700 may be further adapted to send the service indication to the P-CSCF 110, wherein the service indication is embedded in a signaling controlling the communication session. The processing unit 700 may be further adapted to receive the transcript from the P-CSCF 110, either as a continuous stream of transcript chunks, or as an entire transcript at the end of the communication session. The processing unit 700 may be further adapted to store the received transcript in a local memory and displaying the received transcript to the subscriber. In a practical implementation the processing unit 700 may be one processor taking care of all the above functions, or may also be distributed over more than one processor, wherein the functions are distributed over the available processors.

The UE 100 may further comprise a sending unit 702 and a receiving unit 704 via which the UE 100 can communicate with other entities of the communication network 10 such as the P-CSCF 110 or further IMS nodes 120. The sending unit 802 may send out signaling messages composed by the processing unit 700. The receiving unit 804 may receive signaling messages originating from a P-CSCF 110, or from other entities of the communication network 10, or further IMS nodes 120, and forward the received signaling messages to the processing unit 700 for handling. The sending unit 702 and receiving unit 704 may also comprise a wireless network interface.

The UE 100 may also comprise a display unit 706 to display information related to the transcription of sessions to a subscriber or user of the UE 100. For example the received text chunks can be shown on the display unit 706.

The UE 100 may also comprise a storing unit 708 for storing information related to the transcription of sessions. The storing unit 708 may comprise various types of memory such as volatile memory, non-volatile memory, hard disk drives, solid state drives, a network interface to a database or a data center, secure digital cards, or hardware such as smart cards, non-reversible chips, security chips, security modules, or trusted platform module devices. The storing unit 708 may be used by the processing unit 700 to store information, for example received text chunks or program code.

The UE 100 may also comprise an user interaction unit 710 for receiving commands, instructions, or configuration related to the transcription of sessions. The user interaction unit 710 may comprise a keypad or touchscreen input or the like. For example the command to trigger the invocation of the transcription service may be given by the subscriber via the user interaction unit 710 to the processing unit 700.

Figure 8:
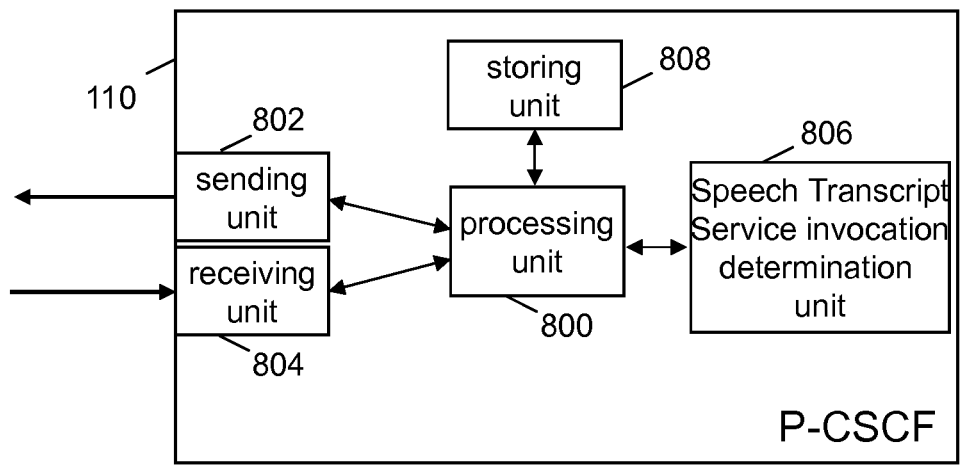
FIG. 8 is a block diagram illustrating a control server of a communication network according to the invention.

Now referring to FIG. 8, this figure shows a block diagram illustrating a control server according to an embodiment. The illustrated entity may correspond to the P-CSCF 110. The P-CSCF 110 may be adapted to perform one or more steps of the above described method shown in FIG. 4.

The P-CSCF 110 may comprise a number of functional units, which are described in further detail below and which are adapted to perform respective method steps.

A processing unit 800 of the P-CSCF 110 may be adapted to receive a service indication indicating that a transcript of the communication session is requested. The processing unit 800 may be further adapted to send a transcription request for the communication session to a PCRF 130 of the communication network 10, if a service indication has been received. The processing unit 800 may be further adapted to receive a transcript from a PCRF 130 either as a continuous stream of transcript chunks, or as an entire transcript at the end of the communication session. The processing unit 800 may be further adapted to deliver the received transcript to a requesting entity. In a practical implementation the processing unit 800 may be one processor taking care of all the above functions, or may also be distributed over more than one processor, wherein the functions are distributed over the available processors.

The P-CSCF 110 may further comprise a sending unit 802 and a receiving unit 804 via which the P-CSCF 110 can communicate with other entities of the communication network 10 such as the UE 100 or further IMS nodes 120. The sending unit 802 may send out signaling messages composed by the processing unit 800. The receiving unit 804 may receive signaling messages originating from a UE 100, or from other entities of the communication network 10, or further IMS nodes 120, and forward the received signaling messages to the processing unit 800 for handling. The P-CSCF 110 may comprise more than one sending unit and receiving unit for signaling capacity and redundancy reasons.

The P-CSCF 110 may further comprise a Speech Transcript Service invocation determination unit 806. The Speech Transcript Service invocation determination unit 806 may interface the processing unit 800 and monitor and analyze incoming control signaling in order to determine whether a service indication indicating that a transcript of the communication session has been received.

The P-CSCF 110 may also comprise a storing unit 808 for storing information related to the transcription of sessions. The storing unit 808 may comprise various types of memory such as volatile memory, non-volatile memory, hard disk drives, solid state drives, a network interface to a database or a data center, secure digital cards, or hardware such as smart cards, non-reversible chips, security chips, security modules, or trusted platform module devices. The storing unit 808 may be used by the processing unit 800 to store information, for example program code.

Figure 9:
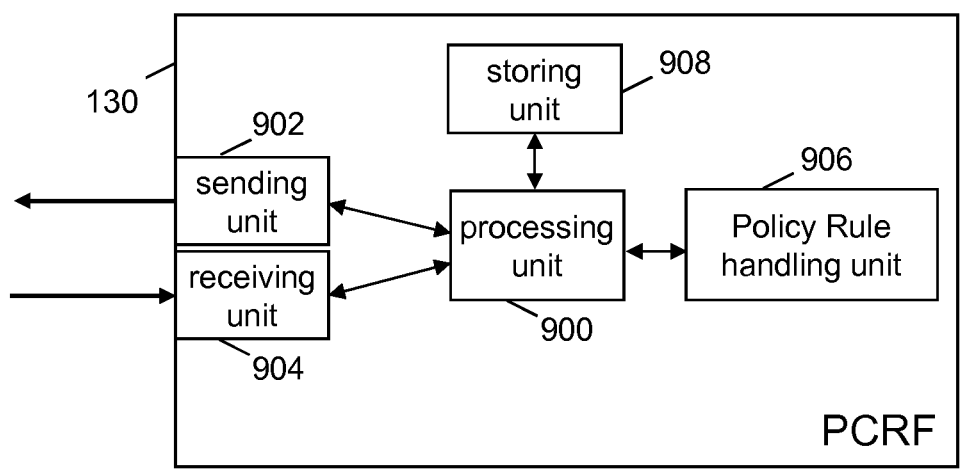
FIG. 9 is a block diagram illustrating a policy controller of a communication network according to the invention.

Now referring to FIG. 9, this figure shows a block diagram illustrating a policy controller according to an embodiment. The illustrated entity may correspond to the PCRF 130. The PCRF 130 may be adapted to perform one or more steps of the above described method shown in FIG. 5.

The PCRF 130 may comprise a number of functional units, which are described in further detail below and which are adapted to perform respective method steps.

A processing unit 900 of the PCRF 130 may be adapted to receive a transcription request for the communication session from the P-CSCF 110. The processing unit 900 may also be adapted to determine at least one policy rule corresponding to the received transcription request. The processing unit 900 may be further adapted to send the determined at least one policy rule to a PGW 140 of the communication network 10. The processing unit 900 may also be adapted to receive a transcript or transcript chunk from the PGW 140. The processing unit 900 may be further adapted to send the received transcript or transcript chunk to the P-CSCF 110. In a practical implementation the processing unit 900 may be one processor taking care of all the above functions, or may also be distributed over more than one processor, wherein the functions are distributed over the available processors.

The PCRF 130 may further comprise a sending unit 902 and a receiving unit 904 via which the PCRF 130 can communicate with other entities of the communication network 10 such as the P-CSCF 110 or the PGW 140. The sending unit 902 may send out signaling messages composed by the processing unit 900. The receiving unit 904 may receive signaling messages originating from a P-CSCF 110 or from the PGW 140, and forward the received signaling messages to the processing unit 900 for handling. The PCRF 130 may comprise more than one sending unit and receiving unit for signaling capacity and redundancy reasons.

The PCRF 130 may further comprise a policy rule handling unit 906. The policy rule handling unit 906 may interface the processing unit 900 and determine policy rules related to sessions and speech stream handling requirements related to transcription of sessions.

The PCRF 130 may also comprise a storing unit 908 for storing information related to the transcription of sessions or handling of policy rules. The storing unit 908 may comprise various types of memory such as volatile memory, non-volatile memory, hard disk drives, solid state drives, a network interface to a database or a data center, secure digital cards, or hardware such as smart cards, non-reversible chips, security chips, security modules, or trusted platform module devices. The storing unit 908 may be used by the processing unit 900 to store information, for example program code or policy rules.

Figure 10:
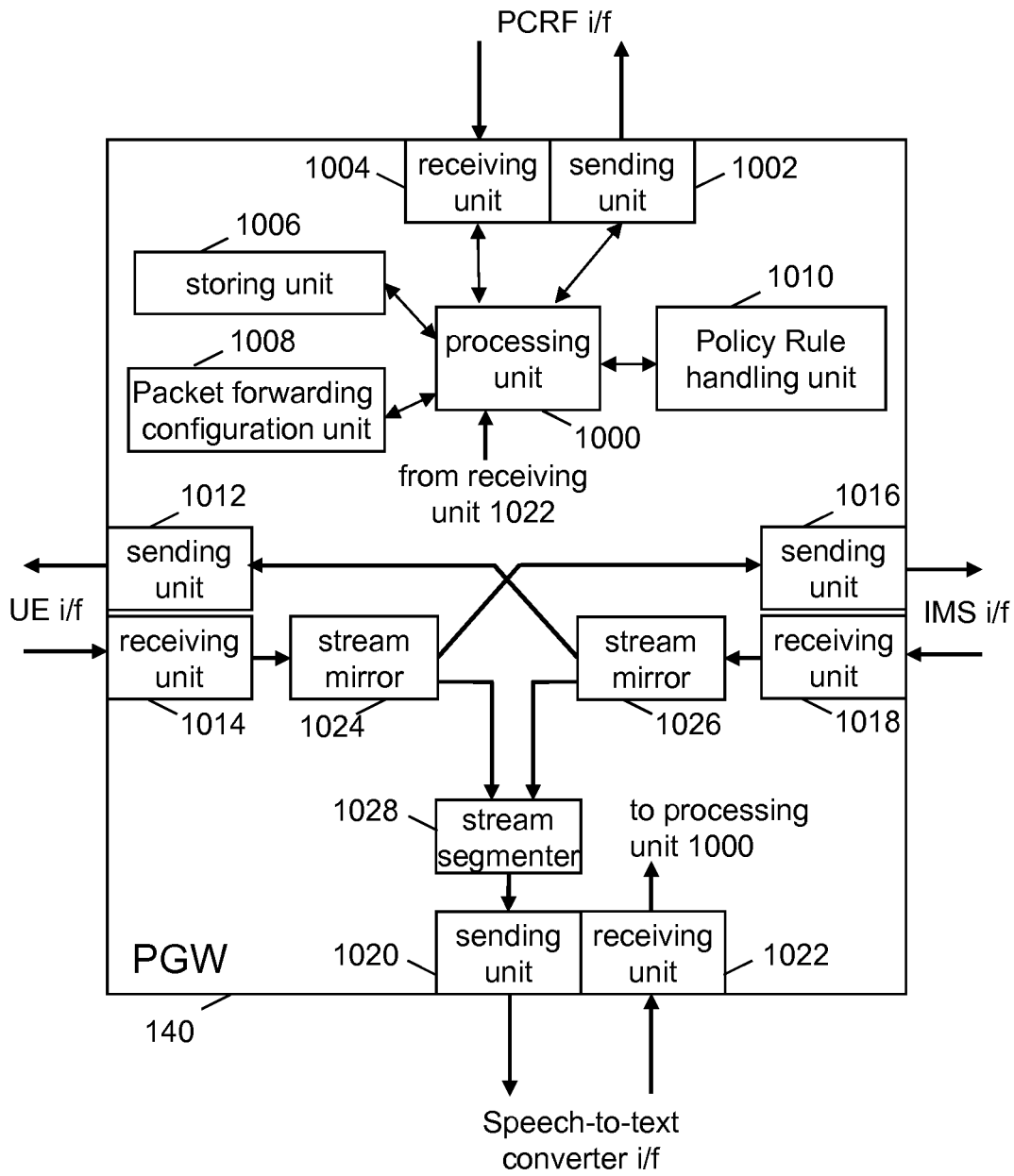
FIG. 10 is a block diagram illustrating a packet gateway node of a communication network according to the invention.

Now referring to FIG. 10, this figure shows a block diagram illustrating a packet gateway node according to an embodiment. The illustrated entity may correspond to the PGW 140. The PGW 140 may be adapted to perform one or more steps of the above described method shown in FIG. 6.

The PGW 140 may comprise a number of functional units, which are described in further detail below and which are adapted to perform respective method steps.

A processing unit 1000 of the PGW 140 may be adapted to receive the at least one policy rule from a PCRF 130 of the communication network 10. The processing unit 1000 may be also adapted to determine, based on the received at least one policy rule, at least one speech stream related to the communication session. The processing unit 1000 may be further adapted to transcribe, based on the at least one policy rule, at least one speech stream related to the communication session. The processing unit 1000 may be also adapted to provide, based on the at least one policy rule, a transcript or a transcript chunk of at least one speech stream related to the communication session. In a practical implementation the processing unit 1000 may be one processor taking care of all the above functions, or may also be distributed over more than one processor, wherein the functions are distributed over the available processors.

The PGW 140 may further comprises multiple sending units 1002, 1012, 1016, 1020 and multiple receiving units 1004, 1014, 1018, 1022 via which the PGW 140 can communicate with other entities of the communication network 10. The sending unit 1002 and the receiving unit 1004 may be used for signaling with a PCRF 130. The sending unit 1002 may send out signaling messages to the PCRF 130 composed by the processing unit 1000. The receiving unit 1004 may receive signaling messages originating from the PCRF 130, and forward the received signaling messages to the processing unit 1000 for handling. The sending units 1012, 1016 and the receiving unit 1014, 1018 may be used to send and receive media plane packets from/to the UE 100 and from/to the further IMS nodes 120. In addition, there may be a sending unit 1020 and a receiving unit 1022 dedicated to provide a media interface to a speech-to-text converter 150. The receiving unit 1022 may interface the processing unit 1000 in order to provide text chunks received from the speech-to-text converter 150 to the processing unit 1000 for further handling.

The PGW 140 may also comprise a storing unit 1006 for storing information related to the transcription of sessions or handling of policy rules. The storing unit 1006 may comprise various types of memory such as volatile memory, non-volatile memory, hard disk drives, solid state drives, a network interface to a database or a data center, secure digital cards, or hardware such as smart cards, non-reversible chips, security chips, security modules, or trusted platform module devices. The storing unit 1006 may be used by the processing unit 1000 to store information, for example program code or policy rules.

The PGW 140 may further comprise a packet forwarding configuration unit 1008. The media plane forwarding of the PGW 140 is done by specialized hardware optimized for mass forwarding of packets. In order to achieve the wanted forwarding behavior in terms of via which sending unit a received packet leaves the PGW 140, the forwarding hardware needs to be configured. The forwarding hardware configuration would also include which additional media plane handling function 1024, 1026, 1028 are passed before a packet is sent out via a sending unit. The packet forwarding configuration unit 1008 interfaces the sending units 1012, 1016, 1020, receiving units 1014, 1018, 1022, and media plane handling function 1024, 1026, 1028 and configures them to achieve the wanted forwarding behavior.

The PGW 140 may also comprise a policy rule handling unit 1010. The policy rule handling unit 1010 may interface the processing unit 1000 and identify speech streams related to policy rules.

The PGW 140 may further comprise media plane handling function 1024, 1026, and 1028. Media plane handling function 1024, 1026 may be stream mirror hardware capable of duplicating an input media stream to two outputs. This allows getting an identical duplicate of a media stream. Media plane handling function 1028 may be a stream segmenter which is able to cut an incoming media stream into segments.

In order for the PGW 140 to achieve the wanted functionality, wherein a copy of at least one speech streams is partitioned into segments before forwarding to the speech-to-text converter, the a packet forwarding configuration unit 1008 may configure the media plane handling of the PGW 140 as follows. The speech stream from the UE 100 to the remote end is received on receiving unit 1014, forwarded to the stream mirror 1024 which duplicates the stream. The first output speech stream is then forwarded to the sending unit 1016, which then sends the speech stream of the UE 100 to the remote end. The speech stream from the remote end to the UE 100 is received on receiving unit 1018, forwarded to the stream mirror 1026 which duplicates the stream. The first output speech stream is then forwarded to the sending unit 1012, which then sends the speech stream of the remote end to the UE 100. The second output of the two stream mirrors 1024 and 1026 are fed into the stream segmenter 1028, which cuts the two speech streams into segments, which then are sent to the speech-to-text converter 150 via sending unit 1020.

The resulting text chunks corresponding to the speech stream segments are then received via receiving unit 1022 from the speech-to-text converter 150 and from there forwarded to the processing unit 1000 for handling.

According to another embodiment, a computer program is provided. The computer program may be executed by the processing units 700, 800, 900, and/or 1000 of the above mentioned entities 100, 110, 130, and 140 respectively such that a method for transcribing of a communication session in a communication network as described above with reference to FIGS. 3 to 6 may be carried out or be controlled. In particular, the entities 100, 110, 130, and 140 may be caused to operate in accordance with the above described method by executing the computer program.

The computer program may be embodied as computer code, for example of a computer program product. The computer program product may be stored on a computer readable medium, for example a disk or the storing unit 708, 808, 908 and/or 1008 of the entities 100, 110, 130, and 140, or may be configured as downloadable information.

One or more embodiments as described above may enable at least one of the following technical effects:
  Realized as network service, so the session transcription is independent from the used UE brand
  Supports communication of handicapped people by displaying text in parallel to the conversation
  Allows to follow a conversation also in a noisy environment by displaying text in parallel to the conversation
  Allows for real-time translation into a different language
  Provides a transcript of an entire conversation at the end of the session, which may be used as conversation minutes or as proof.

Modifications and other embodiments of the disclosed invention will come to mind to one skilled in the art having the benefit of the teachings presented in the foregoing descriptions and the associated drawings. Therefore, it is to be understood that the embodiments are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method for transcribing of a speech communication session in a communication network, the communication network comprising a control server for controlling the speech communication session, wherein the speech communication session is established between a user equipment and a remote end, the method comprising:
  receiving, by the control server, a service indication, embedded in control signaling that maintains the speech communication session between the user equipment and the remote end, indicating that a transcript of the speech communication session is requested;
  sending, by the control server, a transcription request for the speech communication session to a policy controller node of the communication network, based on determining that the service indication, embedded in the control signaling of the speech communication session, has been received;
  determining, by the policy controller node, at least one policy rule corresponding to the service indication of the received transcription request, the at least one policy rule defining a transcription service classification of at least one speech stream transmitted during the speech communication session;
  sending, by the policy controller node, the determined at least one policy rule to a packet gateway node of the communication network;
  providing, by the packet gateway node, based on the at least one policy rule, a transcript or transcript chunks of the at least one speech stream transmitted during the speech communication session to the control server; and
  sending, by the control server, the transcript or transcript chunks of the at least one speech stream to one of the user equipment and remote end.

2. The method according to claim 1, wherein receiving the service indication comprises receiving, by the control server, the service indication embedded in the control signaling of the communication session from the user equipment.

3. The method according to claim 1, wherein receiving the service indication comprises receiving, by the control server, the service indication embedded in the control signaling of the communication session from the remote end, the remote end comprising a further node of the communication network.

4. The method according to claim 1, wherein the service indication indicates that the transcript shall be provided as a continuous stream of transcript chunks, or wherein the service indication indicates that an entire transcript of the continuous stream shall be provided after the communication session has ended.

5. The method according to claim 1, wherein the transcript is a conversion of the at least one speech stream to a corresponding text.

6. The method according to claim 5, wherein the transcribing involves a change of a language between the at least one speech stream and the corresponding text.

7. A method in a user equipment for transcribing of a communication session in a communication network, the communication network comprising a control server for controlling the communication session, wherein the communication session is established between the user equipment and a remote end, the method comprising:
- determining that a subscriber using the user equipment requests a transcript of at least one speech stream of the communication session;
- generating a service indication indicating that a transcript of the least one speech stream of the communication session is requested;
- sending the service indication to the control server, wherein the service indication is embedded in control signaling that maintains the speech communication session between the user equipment and the remote end of the communication session;
- receiving the transcript of the at least one speech stream from the control server, as a continuous stream of transcript chunks, or as an entire transcript at the end of the communication session within the control signaling of the communication session; and
- storing the received transcript or transcript chunks in a local memory.

8. The method according to claim 7, further comprising receiving, the transcript from the control server via an instant messaging session, and wherein the transcription chunks are received as text messages within the instant messaging session.

9. A method in a control server for transcribing of a communication session in a communication network, the communication network comprising the control server for controlling the communication session, wherein the communication session is established between a user equipment and a remote end, the method comprising:
- receiving a service indication embedded in control signaling that maintains the speech communication session between the user equipment and the remote end indicating that a transcript of at least one speech stream of the communication session is requested;
- sending a transcription request for the least one speech stream of the communication session to a policy controller node of the communication network, based on determining a service indication has been received;
- receiving a transcript of the least one speech stream from the policy controller node as a continuous stream of transcript chunks, or as an entire transcript at the end of the communication session; and
- delivering the received transcript within the control signaling of the communication session to one of the user equipment and the remote end.

10. The method according to claim 9, wherein the remote end is a further node of the communication network requesting the transcript of the communication session.

11. The method according to claim 9, wherein the the user equipment requests the transcript of the communication session.

12. The method according to claim 9, wherein the communication session comprises an IP Multimedia System (IMS) session, and wherein the service indication is an indication in one of a Session Description Protocol (SDP) and a Session Initiation Protocol (SIP) Options embedded in the control signaling of the IMS session describing the characteristics of the IMS session.

13. The method according to claim 9, wherein the transcription request for the communication session to the policy controller node is comprised in an initial authorization request for the communication session.

14. The method according to claim 9, further comprising delivering the received transcript chunks by opening an instant messaging session with one of the user equipment and the remote end and delivering the received transcript chunks as text messages within the instant messaging session.

15. A method in a policy controller node for transcribing of a communication session in a communication network, the communication network comprising a control server for controlling the communication session, wherein the communication session is established between a user equipment and a remote end, the method comprising:
- receiving a transcription request for at least one speech stream of the communication session from the control server;
- determining at least one policy rule corresponding to the service indication of the received transcription request, the at least one policy rule defining a transcription service classification of the least one speech stream transmitted during the communication session;
- sending the determined at least one policy rule to a packet gateway node of the communication network;
- receiving a transcript or transcript chunk of the at least one speech stream transmitted during the communication session from the packet gateway node; and
- sending the received transcript or transcript chunk of the at least one speech stream to the control server.

16. The method according to claim 15, wherein the transcription request is comprised in an initial authorization request for the communication session.

17. A method in a packet gateway node for transcribing of a communication session in a communication network, the communication network comprising a control server for controlling the communication session, wherein the communication session is established between a user equipment and a remote end, the method comprising:
- receiving at least one policy rule from a policy controller node of the communication network, the at least one policy rule defining a transcription service classification of at least one speech stream transmitted during the communication session;
- determining, based on the received at least one policy rule, the at least one speech stream transmitted during the communication session;
- transcribing, based on the at least one policy rule, the at least one speech stream transmitted during the communication session; and
- providing, based on the at least one policy rule, a transcript or a transcript chunk of the at least one speech stream transmitted during the communication session to the policy controller node.

18. The method according to claim 17, wherein the at least one speech stream transmitted during the communication session is at least one of the following:
- a speech stream from the user equipment towards a further equipment at the remote end;
- a speech stream from the further equipment at the remote end towards the user equipment.

19. The method according to claim 17, wherein the packet gateway node transcribes the at least one speech stream by:
- forwarding a copy of the at least one speech stream to a speech-to-text converter of the communication network; and receiving the resulting transcript from the speech-to-text converter.

20. The method according to claim 19, wherein the copy of the at least one speech stream is partitioned into segments before forwarding to the speech-to-text converter, and the speech-to-text converter returning a transcript chunk for each segment to the packet gateway node.

21. The method according to claim 19, wherein the packet gateway node receives an entire transcript of the at least one speech stream from the speech-to-text converter when the communication session ends.

22. A user equipment comprising at least one processor for transcribing of a communication session in a communication network, the communication network comprising a control server for controlling the communication session, wherein the communication session is established between the user equipment and a remote end, the at least one processor configured to:
- determine that a subscriber using the user equipment requests a transcript of at least one speech stream of the communication session;
- generate a service indication indicating that a transcript of the least one speech stream of the communication session is requested;
- send the service indication to the control server, wherein the service indication is embedded in control signaling that maintains the speech communication session between the user equipment and the remote end of the communication session;
- receive the transcript of the at least one speech stream from the control server, either as a continuous stream of transcript chunks, or as an entire transcript at the end of the communication session, within the control signaling of the communication session; and
- store the received transcript or transcript chunks in a local memory.

23. The user equipment according to claim 22, wherein the at least one processor is further configured to receive the transcript from the control server via an instant messaging session and wherein the transcription chunks are received as text messages within the instant messaging session.

24. A control server comprising at least one processor for transcribing of a communication session in a communication network, the communication network comprising the control server for controlling the communication session, wherein the communication session is established between a user equipment and a remote end, the at least one processor configured to:
- receive a service indication embedded within control signaling that maintains the speech communication session between the user equipment and the remote end of the communication session indicating that a transcript of at least one speech stream of the communication session is requested;
- send a transcription request for the least one speech stream of the communication session to a policy controller node of the communication network, based on determining a service indication has been received;
- receive a transcript of the least one speech stream from the policy controller node as a continuous stream of transcript chunks; and
- deliver the received transcript within the control signaling of the communication session to one of the user equipment and the remote end.

25. The control server according to claim 24, wherein the at least one processor is further configured to deliver the received transcript by opening an instant messaging session with one of the user equipment and the remote end and delivering the received transcript chunks as text messages within the instant messaging session.

26. A policy controller node comprising at least one processor for transcribing of a communication session in a communication network, the communication network comprising a control server for controlling the communication session, wherein the communication session is established between a user equipment and a remote end, the at least one processor configured to:
- receive a transcription request for at least one speech stream of the communication session from the control server;
- determine at least one policy rule corresponding to the service indication of the received transcription request, the at least one policy rule defining a transcription service classification of the least one speech stream transmitted during the communication session;
- send the determined at least one policy rule to a packet gateway node of the communication network;
- receive a transcript or transcript chunk of the at least one speech stream transmitted during the communication session from the packet gateway node; and
- send the received transcript or transcript chunk of the at least one speech stream to the control server.

27. The policy controller node according to claim 26, wherein the transcription request is comprised in an initial authorization request for the communication session.

28. A packet gateway node comprising at least one processor for transcribing of a communication session in a communication network, the communication network comprising a control server for controlling the communication session, wherein the communication session is established between a user equipment and a remote end, the at least one processor configured to:
- receive at least one policy rule from a policy controller node of the communication network, the at least one policy rule defining a transcription service classification of at least one speech stream transmitted during the communication session;
- determine, based on the received at least one policy rule, the at least one speech stream transmitted during the communication session;
- transcribe, based on the at least one policy rule, the at least one speech stream transmitted during the communication session; and
- provide, based on the at least one policy rule, a transcript or a transcript chunk of the at least one speech stream transmitted during the communication session to the policy controller node.

29. The packet gateway node according to claim 28, wherein the at least one processor is further configured to:
- partition the copy of the at least one speech stream into segments;
- forward the segments to a speech-to-text converter of the communication network; and
- receive a transcript chunk for each segment from the speech-to-text converter.

30. A computer program product comprising a non-transitory computer readable storage medium storing instructions which, when executed on at least one processor, cause the at least one processor to carry out the method according to claim 1.

31. The method according to claim 1, wherein the at least one policy rule identifies a user plane traffic of the communication session identified in the received transcription request.

32. The method according to claim 13, wherein the initial authorization request comprises an initial Authentication/Authorization Request (AAR) command so that the transcription request is included in the AAR command.

33. The method of claim 15, wherein sending the determined at least one policy rule comprises sending the at least one policy rule in a Re-Authorization Request (RAR) command to the packet gateway node.

34. The method of claim 7, further comprising displaying the transcript or the transcript chunks to the subscriber.

35. The user equipment of claim 22, the at least one processor further configured to display the transcript or the transcript chunks to the subscriber.

* * * * *